July 10, 1956        E. H. RYAN        2,754,437
DYNAMOELECTRIC TRANSMISSION
Filed Sept. 20, 1950
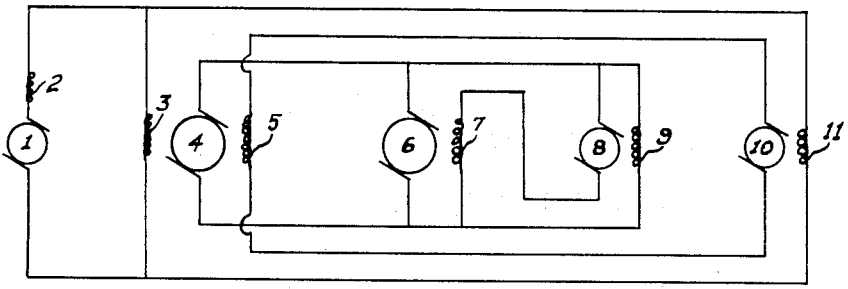
Fig. 1
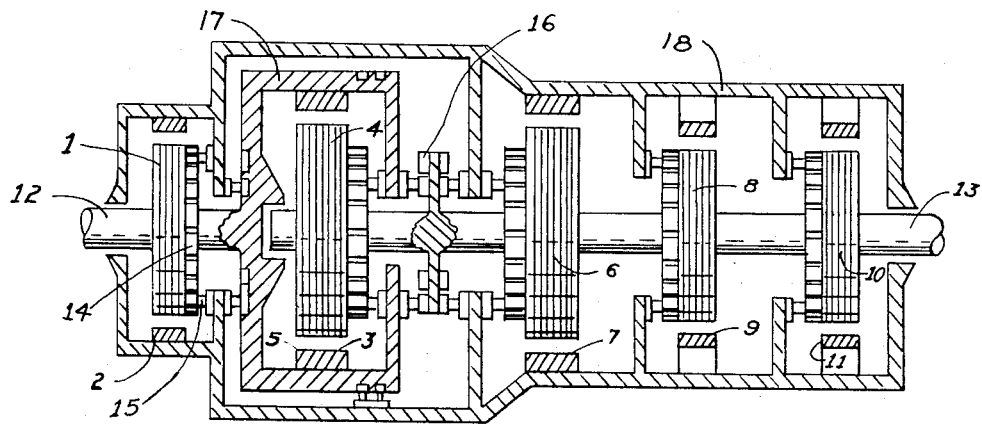
Fig. 2
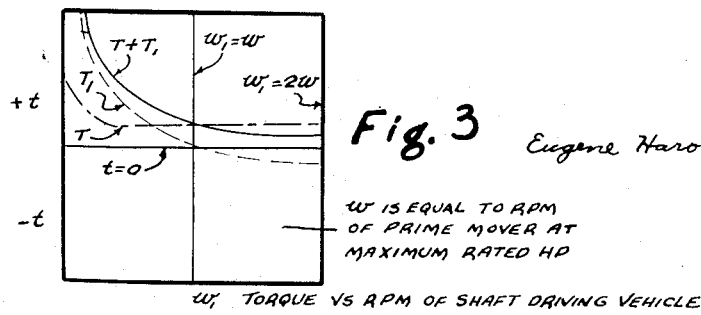
Fig. 3    Eugene Harold Ryan INVENTOR.
$w$ IS EQUAL TO RPM OF PRIME MOVER AT MAXIMUM RATED HP
$w_1$ TORQUE VS RPM OF SHAFT DRIVING VEHICLE

United States Patent Office 2,754,437
Patented July 10, 1956

2,754,437

DYNAMOELECTRIC TRANSMISSION

Eugene Harold Ryan, Long Beach, Calif.

Application September 20, 1950, Serial No. 185,701

3 Claims. (Cl. 310—102)

This patent application concerns improvements in dynamoelectric transmissions as described in abandoned patent application filed by me November 7, 1949 under Serial Number 125,873. The device herein described is called dyna-tork.

Fig. 1 is a wiring diagram of the dynamoelectric elements of the unit; Fig. 2 is an axial sectional view of the unit and Fig. 3 is a chart of three graphs of the operating properties of the unit.

The object of this invention is to provide an automatic regulating device as well as increasing the R. P. M. (rotations per minute) range of driven shaft 13 in Fig. 2 one hundred percent without increasing the cost or size of the dynamoelectric transmission device. The increase in R. P. M. range may be utilized, by mechanical reduction, to increase the initial starting torque one hundred percent where it is not desirable to increase the R. P. M. range.

The name and function of the various parts illustrated in schematic diagram Fig. 1 are as follows: auxiliary generator armature 1 and field 2 provide current to the main dynamo field 3 and drive generator field 11; this current will vary depending on the R. P. M. of the prime mover which is connected to drive shaft 12 in Fig. 2; all fields are mounted in stationary housing 18 except the main dynamo field 3 and auxiliary field 5 which are mounted in case 17, an extension of shaft 12; all armatures are mounted on shaft 13 except the auxiliary generator armature 1 which is mounted on drive shaft 12; when the prime mover is idling the circuit through the auxiliary generator 1 is kept open by an arrangement of relays, not shown; when power is applied by the prime mover the circuit through the auxiliary generator 1 is closed and current flows through the main dynamo field 3 and the drive generator field 11; the excitation of main dynamo field 3 and the R. P. M. of case 17 cause current to flow through the second dynamo armature 6, secondary dynamo field 7, auxiliary dynamo armature 8 and field 9 as shown in Fig. 1; this current causes a torque to be set up in shaft 13 by the secondary 6 and auxiliary 8 dynamos plus the torque developed by the main dynamo armature 4; as shaft 13 begins to rotate and drive shaft 12 begins to supply maximum H. P. (horsepower) at rated R. P. M. the conventional dynamoelectric transmission consisting of dynamos 4 and 6 only would begin to develop back E. M. F. (electromotive force) in dynamo 6 which would reduce the current; added to this would be the effect of reduced E. M. F. developed by dynamo 4, because of reduced R. P. M. as the R. P. M. of drive shaft 13 began to approach that of drive shaft 12; the result would be that driven shaft 13 would be able to absorb the rated H. P. of the prime mover over only a relatively small range of speeds thus reducing its value as a transmission device; in dyna-tork this condition is rectified by the increasing current supplied to the main dynamo secondary field 5 through the drive generator 10 and by the weakening of the secondary dynamo field 7 as the current decreases because of the back E. M. F. developed in auxiliary dynamo 8; as the ratio of drive shaft 12 to shaft 13 R. P. M. approaches one, the back E. M. F. of auxiliary dynamo 8 increases till it exceeds the E. M. F. developed by the main dynamo 4 and the current reverses in secondary dynamo field 7 causing the secondary dynamo 6 to become a generator and the main dynamo 4 to become a motor thus permitting shaft 13 to continue accelerating till it reaches twice the R. P. M. of shaft 12.

The following is an analysis of the relationship of torque and R. P. M. of the various generators and dynamos assuming no conversion losses:

$w$ is angular velocity of drive shaft 12
$w_1$ is angular velocity of shaft 13
$T$ is torque applied to shaft 13 by armature 4
$T_1$ is torque applied to shaft 13 by armature 6
$T_2$ is torque applied to shaft 13 by armature 8
$T_3$ is torque applied to shaft 13 by armature 10
$T_4$ is torque applied to shaft 12 by armature 1
$T_5$ is torque applied to shaft 12 by prime mover for $W$ greater than $w_1$
$$T_5 w = T w_1 - T_4 w + T_1 w_1 + T_2 w_1 - T_3 w_1$$
for $w$ less than $w_1$
$$T_5 w = T w_1 - T_4 w - T_1 w_1 + T_2 w_1 - T_3 w_1$$

Fig. 3 graphically illustrates the relation between torque applied to shaft 13 and the angular velocity of shaft 13, neglecting converse losses and those due to auxiliaries 1, 8 and 10.

Although it is anticipated that the perfected design of this dynamoelectric transmission may not be completely automatic it will however reduce to a minimum the power losses caused by the introduction of variable resistors into the circuits to render it fully automatic.

Although but one arrangement of circuits has been shown it will be apparent to those skilled in the art that various changes and modifications may be made therein without departing from the spirit of the invention or from the scope of the appended claims.

It is claimed and desired to secure by Letters Patent:

1. In an apparatus of the character described, the combination of a prime mover, a driven shaft, a generator having rotary field and armature elements, one element driven by the prime mover and the other connected to the driven shaft, a motor connected to receive (or impress) electrical energy from (or upon) the generator and having one element connected to transmit power to and from the driven shaft, an exciting winding for the motor; two sources of E. M. F. conected in series with said exciting winding, the first source of E. M. F. being derived from the generator, the second source of E. M. F. being an auxiliary dynamo operated by the driven shaft, said auxiliary dynamo having an exciting winding powered by the generator.

2. In an apparatus of the character described, the combination of a prime mover, a driven shaft, a motor having one element connected to transmit power to and from the driven shaft and the other element stationary, a generator having rotary field and armature elements, the armature being connected to impress (or receive) electrical energy upon (or from) the motor and having one element connected to the driven shaft and the other connected to the prime mover, an exciting winding for the generator; two sources of E. M. F. powering the generator exciting winding, the first source of E. M. F. being variable with the prime mover speed and the second being variable with the speed of the driven shaft.

3. In an apparatus of the character described, the combination of a prime mover, a driven shaft, a motor having one element connected to transmit power to and from the driven shaft and the other element stationary, a generator having rotary field and armature elements, the armature being connected to impress (or receive) electrical energy upon (or from) the motor and having one element connected to the driven shaft and the other connected to the prime mover, an exciting winding for the generator; two sources of E. M. F. powering the generator exciting winding, the first source of E. M. F. being derived from an auxiliary dynamo connected to rotate with the prime mover, the second being derived from an auxiliary dynamo connected to the driven shaft.

References Cited in the file of this patent

UNITED STATES PATENTS

| | | |
|---|---|---|
| 847,079 | Johannet | Mar. 12, 1907 |
| 925,504 | Porsche | June 22, 1909 |
| 1,361,244 | Fynn | Dec. 7, 1920 |
| 1,559,945 | Entz | Nov. 3, 1925 |
| 2,085,763 | Neuland | July 6, 1937 |
| 2,223,210 | Hefel | Nov. 26, 1940 |
| 2,258,005 | Durdin | Oct. 7, 1941 |